United States Patent
Hachisuka et al.

(10) Patent No.: US 12,186,714 B2
(45) Date of Patent: Jan. 7, 2025

(54) REVERSE OSMOSIS MEMBRANE AND METHOD OF PRODUCING THE SAME

(71) Applicant: MEMSTAR USA INC., Conroe, TX (US)

(72) Inventors: Hisao Hachisuka, Conroe, TX (US); Mavis C. Y. Wong, Conroe, TX (US)

(73) Assignee: Memstar USA Inc., Conroe, TX (US)

( * ) Notice: Subject to any disclaimer, the term of this patent is extended or adjusted under 35 U.S.C. 154(b) by 0 days.

(21) Appl. No.: 17/781,051

(22) PCT Filed: Nov. 30, 2020

(86) PCT No.: PCT/US2020/062625
§ 371 (c)(1),
(2) Date: May 31, 2022

(87) PCT Pub. No.: WO2022/115115
PCT Pub. Date: Jun. 2, 2022

(65) Prior Publication Data
US 2023/0241559 A1 Aug. 3, 2023

(51) Int. Cl.
| B01D 61/02 | (2006.01) |
| B01D 67/00 | (2006.01) |
| B01D 69/02 | (2006.01) |
| B01D 69/12 | (2006.01) |
| B01D 71/56 | (2006.01) |

(52) U.S. Cl.
CPC .......... B01D 71/56 (2013.01); B01D 61/025 (2013.01); B01D 67/0006 (2013.01);
(Continued)

(58) Field of Classification Search
CPC .. B01D 71/56; B01D 61/025; B01D 67/0006; B01D 67/0083; B01D 69/02;
(Continued)

(56) References Cited

U.S. PATENT DOCUMENTS

| 4,277,344 A |   | 7/1981 | Cadotte |
| 4,761,234 A |   | 8/1988 | Uemura et al. |
| 4,769,148 A |   | 9/1988 | Fibiger et al. |
| 4,872,984 A |   | 10/1989 | Tomaschke |
| 4,948,507 A | * | 8/1990 | Tomaschke .......... B01D 69/125 210/500.38 |
| 4,983,291 A |   | 1/1991 | Chau et al. |

(Continued)

FOREIGN PATENT DOCUMENTS

CN 101027113 A * 8/2007 ........... B01D 61/025

OTHER PUBLICATIONS

English Translation of Patent Publication CN-101027113-A, filed Aug. 29, 2007. (Year: 2007).*
International Search Report and Written Opinion of International Patent Application No. PCT/US2020/062625 mailed Apr. 7, 2021 (16 pages).
(Continued)

*Primary Examiner* — Joseph W Drodge
(74) *Attorney, Agent, or Firm* — Pyprus Pte Ltd; George D. Liu

(57) ABSTRACT

A composite polyamide reverse osmosis membrane comprising a polyamide layer; where the polyamide layer has a thickness in the range of 50-250 nm, and large open spaces (i.e., free volumes); where the open spaces are defined by a ratio of water flux, $J_w$, (gfd) divided by the average surface roughness, Ra, (nm) of the polyamide layer; wherein the composite polyamide reverse osmosis membrane has the ratio of $J_w/Ra > 0.35$ gfd/nm when tested at 65 psi, using an aqueous solution containing 250 ppm of NaCl; and a microporous support with a thickness ranging from 100-150 μm. The present invention also relates to processes of fabricating the composite polyamide reverse osmosis membrane.

17 Claims, 3 Drawing Sheets

(52) U.S. Cl.
CPC ......... *B01D 67/0083* (2013.01); *B01D 69/02* (2013.01); *B01D 69/12* (2013.01); *B01D 69/1251* (2022.08); *B01D 2323/081* (2022.08); *B01D 2323/216* (2022.08); *B01D 2323/219* (2022.08); *B01D 2323/30* (2013.01); *B01D 2323/48* (2013.01); *B01D 2325/04* (2013.01); *B01D 2325/06* (2013.01)

(58) Field of Classification Search
CPC ................ B01D 69/12; B01D 69/1251; B01D 2323/081; B01D 2323/216; B01D 2323/219; B01D 2323/30; B01D 2323/48; B01D 2325/04; B01D 2325/06; B01D 2323/08; B01D 2323/21834; B01D 2323/40; B01D 67/006; B01D 67/009; B01D 67/0011; B01D 67/013; B01D 69/10; B01D 69/107; B01D 69/125; B01D 67/1251; B01D 2323/15; B01D 2323/218; C08J 2323/12; C08J 2367/00; C08J 2477/00; C08J 2481/06; C08J 5/2275; C08J 7/042; Y02A 20/131
See application file for complete search history.

(56) References Cited

U.S. PATENT DOCUMENTS

| | | | |
|---|---|---|---|
| 5,246,587 A * | 9/1993 | Tomaschke | B01D 69/125 210/500.38 |
| 5,576,057 A | 11/1996 | Hirose et al. | |
| 5,614,099 A | 3/1997 | Hirose et al. | |
| 6,063,278 A | 5/2000 | Koo et al. | |
| 6,245,234 B1 * | 6/2001 | Koo | B01D 69/125 427/244 |
| 6,368,507 B1 * | 4/2002 | Koo | B01D 71/56 210/490 |
| 7,001,518 B1 | 2/2006 | Tomaschke | |
| 10,058,822 B2 | 8/2018 | Diallo | |
| 2017/0056840 A1 | 3/2017 | Koehler | |
| 2017/0197182 A1 | 7/2017 | Holmberg et al. | |

OTHER PUBLICATIONS

International Preliminary Report on Patentability of International Patent Application No. PCT/US2020/062625 mailed Mar. 10, 2022 (20 pages).

* cited by examiner (a)

(b)

REVERSE OSMOSIS MEMBRANE AND METHOD OF PRODUCING THE SAME

FIELD OF THE INVENTION

The present invention relates to the membrane technology, and more specifically to a reverse osmosis membrane and an interfacial synthesis method for making the reverse osmosis membrane.

BACKGROUND OF THE INVENTION

It is known that dissolved substances can be separated from their solvents by using various types of selective membranes; examples of such membranes include micro filtration membranes, ultrafiltration membranes, nanofiltration membrane and reverse osmosis membranes.

One application of reverse osmosis membranes is in the desalination of brackish water, tap water or wastewater to provide relatively non-salty water suitable for industrial, agricultural, or home use.

The desalination of brackish water and tap water using reverse osmosis membranes involves a filtering out of salts and other dissolved ions or molecules from the salty water by forcing the salty water through a reverse osmosis membrane whereby purified water passes through the membrane while salts and other dissolved ions and molecules do not pass through the membrane.

Osmotic pressure works against the reverse osmosis process, and the more concentrated the feed water, the greater the osmotic pressure which must be overcome. A reverse osmosis membrane, in order to be commercially useful in desalinating brackish water, tap water, wastewater etc., must possess certain properties. One such property is that the membranes have a high flux characteristic, i.e., the ability to pass a relatively large amount of water through the membrane at relatively lower pressures or more amount of water through the membrane at the same pressures.

Typically, the flux for the membrane should be greater than 15 gallon/foot/day (gfd) at a pressure of 65 psi for residential applications and should be greater than 25 gfd at a pressure of 225 psi for brackish water filtration. More preferably, the flux for the membrane is at least about 27 gfd at 65 psi for home use applications. For certain applications, a rejection rate that is less than that which would otherwise be desirable may be acceptable in exchange for higher flux and vice versa.

In the market of reverse osmosis membranes, especially for tap water applications, it is preferred to have a membrane with as high as possible of a water permeability with a good rejection.

Reverse osmosis membranes have been the focus of water separation technologies since it was invented and patented by Cadotte in U.S. Pat. No. 4,277,344 in 1981. In brief, the polyamide membrane described by Cadotte is formed by an interfacial polymerization reaction between an essentially monomeric poly acyl halide and a monomeric arylene polyamine with a measurable water solubility. Since then, there have been numerous efforts to improve membrane performance, resistance to scaling and fouling and chemical degradation. These efforts include post-treatment of the formed membrane as well as the use of various additives in the solutions used in the interfacial polymerization reaction.

In U.S. Pat. No. 7,001,518 B1, Tomaschke coated the polyamide skin layer of a reverse osmosis membrane with a solution containing an organic sulfonic acid compound to improve the flux of an already formed polyamide composite membrane. Examples of sulfonic acid compounds include simple alkyl and aromatic sulfonic and disulfonic acids. In general, it was found that the higher the acid concentration, the longer the contact time, the higher the temperature of the acid, and the hotter the drying time, the more permeable the resultant polyamide composite membrane. Tomaschke hypothesized that the sulfonic acid compound swells the crosslinked polyamide and solvates the uncrosslinked polyamide structures making up the membrane skin layer. These solvated fragments are then removed from the crosslinked film matrix leaving behind a more permeable polymeric skin layer.

U.S. Pat. No. 4,872,984, issued to Tomaschke, describes the formation of a water permeable membrane with excellent salt rejection and flux prepared by interfacial polymerizing, on a microporous support, (1) an essentially monomeric, aromatic polyamine reactant having at least two functional amine groups, and (2) an essentially monomeric, aromatic, amine-reactive reactant comprising a polyfunctional acyl halide or mixture thereof, wherein the amine-reactive reactant has, on the average, at least about 2.2 acyl halide groups per reactant molecule, in the presence of (3) a monomeric amine salt.

In U.S. Pat. No. 6,063,278, issued to Koo et al., the polyamide membrane comprises of a reaction between (i) a polyfunctional amine and (ii) an amine-reactive reactant selected from the group consisting of a polyfunctional acyl halide, a polyfunctional sulfonyl halide and a polyfunctional isocyanate (iii) in the presence of a salt-containing compound, with said salt-containing compound preferably being a reaction product of a strong acid and a polyfunctional amine. Koo et al. found that polyamide membranes made in the presence of compounds comprising at least one tertiary amine salt functional group and at least one tertiary functional amine group possess unexpectedly better flux than do polyamide membranes made in the presence of a single tertiary amine salt functional group only and no tertiary functional amine groups. Koo et al. reasoned that the improved flux could be caused by the tertiary functional amine group acting as a proton acceptor for acid by-products in the interfacial polymerization reaction between the polyfunctional amine and the amine-reactive polyfunctional acyl halide.

Other patents of interest include U.S. Pat. No. 5,614,099 by inventors Hirose et al., which was issued on Mar. 25, 1997, U.S. Pat. No. 5,576,057 by inventors Hirose et al., which was issued on Nov. 19, 1996, U.S. Pat. No. 4,983,291 by inventors Chau et al., which was issued on Jan. 8, 1991, U.S. Pat. No. 4,761,234 by inventors Uemura et al., which was issued on Aug. 2, 1988, and U.S. Pat. No. 4,769,148 by inventors Fibiger et al., which was issued on Sep. 6, 1988, all of which are incorporated herein by reference.

SUMMARY OF THE INVENTION

One aspect of the present invention provides a process for fabricating a composite polyamide reverse osmosis membrane, comprising:
providing a microporous support; coating the microporous support with an aqueous solution to form a liquid layer on the microporous support; wherein the aqueous solution comprises a monomeric polyamine having at least two functional amine groups; wherein the monomeric polyamine is in an amount in the range of 0.1 to 20 wt % of the aqueous solution; and an aliphatic sulfonic acid; wherein the aliphatic sulfonic acid is in an amount in the range of 0.25 to 10.0 wt % of the aqueous solution; wherein the aqueous solution has a pH value in the range of 5.5 to 11;

contacting the liquid layer with an organic solution to form an organic layer; wherein the organic solution comprises an amine-reactive reactant and an organic solvent; wherein the amine-reactive reactant is in the range of 0.01 to 5.0 wt/vol % of the organic solution; and drying the microporous support together with the liquid layer and organic layer at a temperature of about 500 to 180° C.; thereby forming a composite polyamide reverse osmosis membrane.

In certain embodiments of the process, the aqueous solution further comprises a single tertiary amine; wherein the single tertiary amine is in an amount in the range of 1 to 10 wt % of the aqueous solution.

In certain embodiments of the process, the monomeric polyamine is an aromatic primary diamine represented by formula (I):

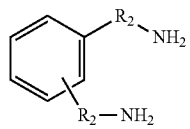

(I)

where $R_1$ and $R_2$ can be an alkyl group (e.g. a methyl group, an ethyl group), an alkoxy group (e.g. a methoxy group, an ethoxy group), a hydroxy alkyl group, a hydroxy group, or a halogen atom, where $R_1$ and $R_2$ can be in the meta-, ortho-, or para-position on the aromatic ring, provided that steric hindrances are accounted for.

In certain embodiments of the process, the monomeric polyamine is selected from the groups consisting of m-phenylenediamine, p-phenylenediamine, and substituted derivatives thereof.

In certain embodiments of the process, the monomeric polyamine is an aliphatic primary diamine represented by formula (II):

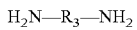

(II)

where $R_3$ is a straight or branched aliphatic hydrocarbon chain, a cycloaliphatic hydrocarbon consisting of 4 or more carbon atoms, or branched aliphatic hydrocarbon chain containing an aromatic or cycloaliphatic ring.

In certain embodiments of the process, the monomeric polyamine is an aromatic, secondary diamine represented by formula (III):

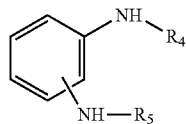

(III)

where $R_4$ and $R_5$ are straight or branched aliphatic hydrocarbon groups, which can contain aromatic rings, and where the amine groups can be in the meta-, ortho- or para-positions on the aromatic ring.

In certain embodiments of the process, the aromatic secondary diamine is selected from the group consisting of N,N'-dimethyl-1,3-phenylenediamine and N-(1,3-Dimethylbutyl)-N'-phenyl-p-phenylenediamine.

In certain embodiments of the process, the monomeric polyamine is a cycloaliphatic, secondary diamine represented by formula (IV):

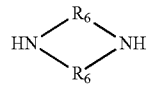

(IV)

where $R_6$ is a cycloaliphatic hydrocarbon. One example of a cycloaliphatic secondary diamine is piperazine.

In certain embodiments of the process, the aliphatic sulfonic acid is represented by the formula (V)

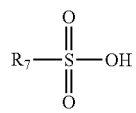

(V)

where $R_7$ is a straight or branched aliphatic hydrocarbon(s) and the hydrocarbon number is from C1 to C10 atoms, preferably C1 to C5.

In certain embodiments of the process, the aliphatic sulfonic acid is selected from the group consisting of methane sulfonic acid, ethane sulfonic acid, 1-propanesulfonic acid, 2-propanesulfonic acid, 1-butanesulfonic acid, 2-butanesulfonic acid, 3-methylbutane-1-sulfonic acid, 1-hexanesulfonic acid, 2-methylhexane-3-sulfonic acid, and 3-ethylhexane-1-sulfonic acid.

In certain embodiments of the process, the single tertiary amine is represented by the formula (VI):

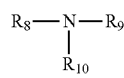

(VI)

where $R_8$, $R_9$ and $R_{10}$ are a straight or branched aliphatic hydrocarbon(s) and the hydrocarbon number is from C1 to C7 atoms.

In certain embodiments of the process, the single tertiary amine is selected from the group consisting of trimethylamine, triethylamine, tripropylamine, and tributylamine.

In certain embodiments of the process, the aqueous solution further comprises a surfactant selected from the group consisting of sodium dodecyl benzene sulfonate (SDBS), sodium dodecyl sulfate (SDS), sodium lauryl sulfate (SLS), and mixtures thereof; wherein the surfactant is the range of 0.01 to 0.5 wt % of the aqueous solution.

In certain embodiments of the process, the aqueous solution further comprises an alcohol selected from the group consisting of methanol, ethanol, isopropyl alcohol, tert-butyl alcohol, and mixtures thereof; wherein the alcohol is in the range of 0.1 to 15 wt % of the aqueous solution.

In certain embodiments of the process, the amine-reactive reactant is selected from the group consisting of a polyfunctional acyl halide, a polyfunctional sulfonyl halide and a polyfunctional isocyanate.

In certain embodiments of the process, the amine-reactive reactant is selected from the group consisting of trimesoyl chloride (TMC), isophthaloyl chloride (IPC), terephthaloyl chloride (TPC), and mixtures thereof.

In certain embodiments of the process, the organic solvent is selected from the group consisting of hexane, nonane, cyclohexane, Freon® (DuPont), and Isopar™ E Solvent (Exxon Corp.).

In certain embodiments of the process, the organic solution further comprises an alcohol selected from the group consisting of methanol, ethanol, isopropyl alcohol, tert-butyl alcohol, and mixtures thereof; wherein the alcohol is in the range of 0.001 to 1 wt % of the organic solution.

The present invention provides a composite polyamide reverse osmosis membrane comprising:

a polyamide layer; where the polyamide layer has a thickness in the range of 50-250 nm, and large open spaces (i.e., free volumes); where the open spaces are defined by a ratio of water flux, $J_w$, (gfd) divided by the average surface roughness, Ra, (gfd/nm) of the polyamide layer; wherein the composite polyamide reverse osmosis membrane has the ratio of $J_w$/Ra>0.35 gfd/nm when tested at 65 psi, using an aqueous solution containing 250 ppm of NaCl; and a microporous support with a thickness ranging from 100-180 μm.

In certain embodiments of the composite polyamide reverse osmosis membrane, the microporous support comprises:

a polymeric layer with a thickness in the range of 30-80 μm; formed on top of a fabric layer with a thickness in the range of 70-100 μm.

In certain embodiments of the composite polyamide reverse osmosis membrane, the polymeric layer is selected from the group consisting of a polysulfone polymer, a polyether sulfone polymer, a polyimide polymer, a polyamide polymer, a polypropylene polymer, a polyarylether sulfone polymer, and polyvinylidene fluoride polymers.

In certain embodiments of the composite membrane, the fabric layer is a woven or non-woven support made from materials selected from the group consisting of polyethylene terephthalate (PET), polyester blends and polypropylene.

The objectives of and advantages of the invention will become apparent from the following detailed description of preferred embodiments thereof in connection with the accompanying drawings.

BRIEF DESCRIPTION OF THE DRAWINGS

Preferred embodiments according to the present invention will now be described with reference to the Figures, in which like reference numerals denote like elements.

DETAILED DESCRIPTION OF THE INVENTION

The present invention may be understood more readily by reference to the following detailed description of certain embodiments of the invention.

Throughout this application, where publications are referenced, the disclosures of these publications are hereby incorporated by reference, in their entireties, into this application in order to more fully describe the state of art to which this invention pertains.

The present invention provides a composite polyamide reverse osmosis membrane. The composite polyamide reverse osmosis membrane is water permeable. The composite polyamide reverse osmosis membrane has large open spaces (i.e. free volume) in a polyamide layer and is useful for separation of fluid mixtures and solutions, for example, for desalination of an aqueous solution when extremely high water permeability is preferred.

Figure 1:
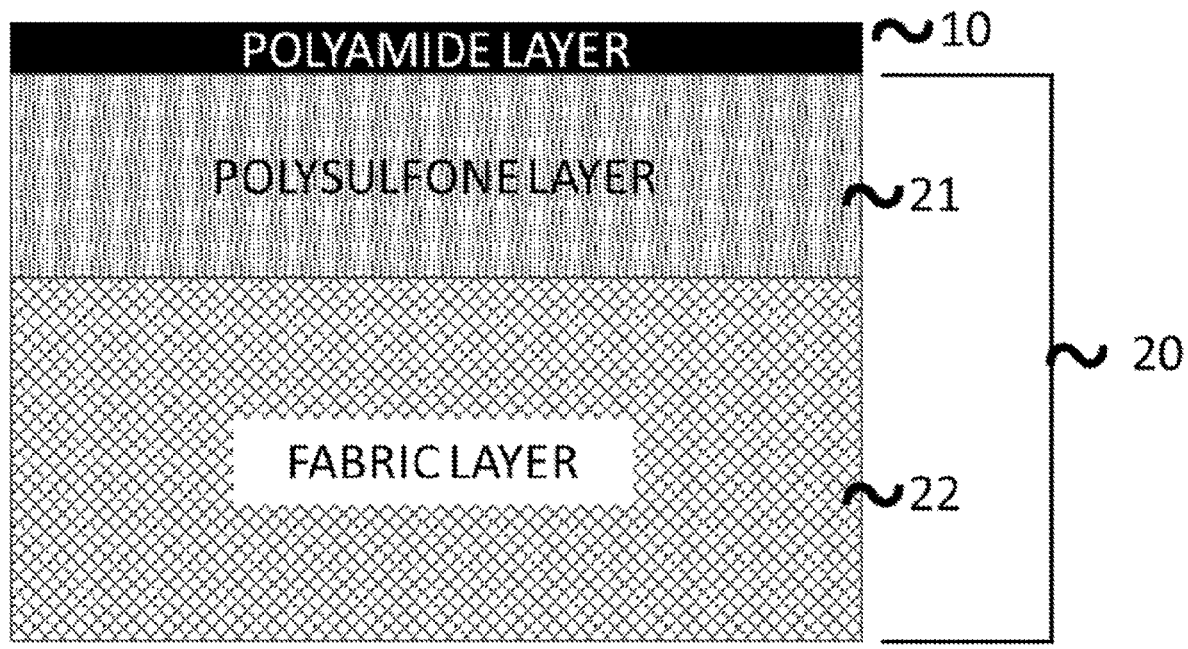
FIG. 1 shows a schematic view of the composite polyamide reverse osmosis membrane in accordance with certain embodiments of the present invention.

Referring now to FIG. 1, there is provided a schematic view of the composite polyamide reverse osmosis membrane in accordance with certain embodiments of the present invention. It is to be noted that the layers are not shown to scale. As shown in FIG. 1, the composite polyamide reverse osmosis membrane 1 comprises:

a polyamide layer 10; where the polyamide layer 10 has a thickness in the range of 50-250 nm, and large open spaces (i.e., free volumes); where the open spaces are defined by the ratio of water flux, $J_w$ (gfd) divided by the average surface roughness, Ra (nm), of the polyamide layer; and a microporous support 20 with a thickness ranging from 100-150 μm. The microporous support 20 itself can be composed of multiple layers. As shown in FIG. 1, in certain embodiments, the microporous support 20 comprises a polymeric layer 21 with a thickness in the range of 30-80 μm, and a fabric layer 22 with a thickness in the range of 70-100 μm. For the convenience of description, the microporous support 20 has two surfaces, one designated as "bottom surface" (i.e. exposed surface), and the other as "top surface" (i.e. the surface being disposed with the polyamide layer 10).

In certain embodiments, the polymeric layer 21 is formed by precipitation on the fabric layer 22. The polymeric layer 21 could be a polysulfone polymer, a polyether sulfone polymer, a polyimide polymer, a polyamide polymer, a polypropylene polymer, and various halogenated polymers such as polyvinylidene fluoride polymers. In certain embodiments, the polymeric layer is made of a polyarylether sulfone.

In certain embodiments, the fabric layer 22 can be a non-woven or woven support material made of materials including polypropylene or polyester. Polypropylene fabric substrates are used in applications where chemical resistance and chemical stability is of importance. The fabric substrate requires a high degree of uniformity in terms of thickness, smoothness, and the number of defects as these characteristics affect the uniformity of the polymeric layer casted on top, and thereby the performance of the overall microporous support membrane.

The microporous support 20 acts as a layer to support the interfacial polymerization reaction. In certain embodiments, the microporous support 20 has an asymmetric structure, from large finger-like voids at the bottom surface to a denser sponge-like structure at the top surface. The microporous support 20 provides mechanical integrity to the overall composite reverse osmosis membrane when used under reverse osmosis testing pressures. In certain embodiments, the microporous support has a molecular weight cut-off (MWCO) of 100 kDa.

The composite polyamide reverse osmosis membrane 1 exhibits an extremely high flux of greater than 35 gfd and a salt rejection of >97% when tested at very low pressures, such as 65 psi, using an aqueous solution containing 250 ppm of NaCl.

The present invention provides a process for fabricating the composite polyamide reverse osmosis membrane.

Figure 2:
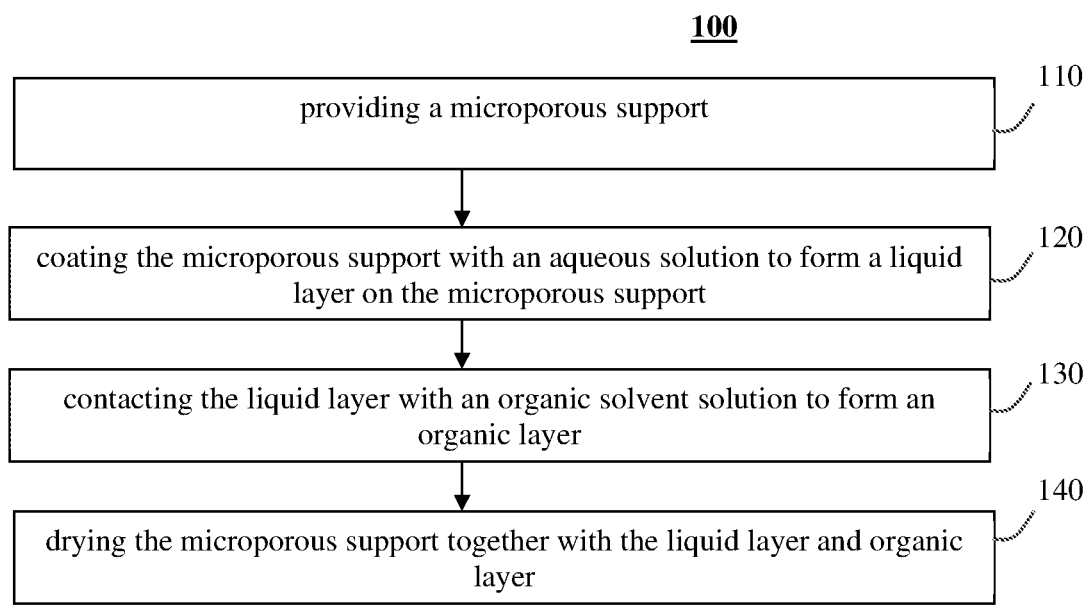
FIG. 2 shows a flowchart of the process for fabricating the composite polyamide reverse osmosis membrane in accordance with certain embodiments of the present invention.

Referring now to FIG. 2, there is provided a flowchart of the process for fabricating the composite polyamide reverse osmosis membrane in accordance with certain embodiments of the present invention. The process 100 comprises:

providing 110 a microporous support as described above;

coating 120 the microporous support with an aqueous solution to form a liquid layer on the microporous support;

contacting 130 the liquid layer with an organic solution to form an organic layer on top of the liquid layer; and drying 140 the microporous support together with the liquid layer and organic layer; thereby a composite polyamide reverse osmosis membrane is fabricated.

In certain embodiments, the aqueous solution comprises:

a monomeric polyamine having at least two functional amine groups; and an aliphatic sulfonic acid.

In certain embodiments, the aqueous solution comprises:

a monomeric polyamine having at least two functional amine groups;

an aliphatic sulfonic acid; and a single tertiary amine.

In certain embodiments, the monomeric polyamine has 2 functional amine groups. In certain embodiments, the monomeric polyamine has 3 functional amine groups. It is to be noted that the presence of an insignificant amount of non-monomeric forms in the monomeric polyamine reagent does not affect the membrane and process of the present invention.

In certain embodiments, the monomeric polyamine is an aromatic primary diamine represented by formula (I):

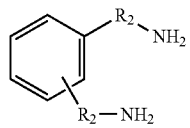
(I)

where $R_1$ and $R_2$ can be an alkyl group (e.g. a methyl group, an ethyl group), an alkoxy group (e.g. a methoxy group, an ethoxy group), a hydroxy alkyl group, a hydroxy group, or a halogen atom, where $R_1$ and $R_2$ can be on the meta-, ortho- or para-position on the aromatic ring, provided that steric hindrances are accounted for.

Examples of the aromatic primary diamines include m-phenylenediamine, p-phenylenediamine, and substituted derivatives thereof.

In certain embodiments, the monomeric polyamine is an aliphatic primary diamine represented by formula (II):

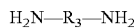
(II)

where $R_3$ is a straight or branched aliphatic hydrocarbon chain, a cycloaliphatic hydrocarbon consisting of 4 or more carbon atoms, or branched aliphatic hydrocarbon chain containing an aromatic or cycloaliphatic ring.

In certain embodiments, the monomeric polyamine is an aromatic, secondary diamine represented by formula (III):

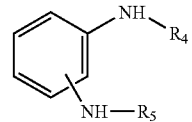
(III)

where $R_4$ and $R_5$ are straight or branched aliphatic hydrocarbon groups, which can contain aromatic rings, and where the amine groups can be in the meta-, ortho- or para-positions on the aromatic ring.

In certain embodiments, the aromatic secondary diamine is selected from the group consisting of N,N'-dimethyl-1,3-phenylenediamine, and N-(1,3-Dimethylbutyl)-N'-phenyl-p-phenylenediamine.

In certain embodiments, the monomeric polyamine is a cycloaliphatic, secondary diamine represented by formula (IV):

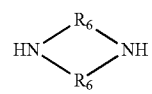
(IV)

where $R_6$ is a cycloaliphatic hydrocarbon. One example of a cycloaliphatic secondary diamine is piperazine.

In certain embodiments, the aliphatic sulfonic acid is represented by the formula (V)

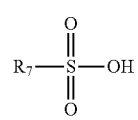
(V)

where $R_7$ can be a straight or branched aliphatic hydrocarbon(s) and the hydrocarbon number is from C1 to C10 atoms, preferably C1 to C5. Low hydrocarbon number (preferably C1-C3) can increase flux more significantly, specifically when methane sulfonic acid is used. If hydrocarbon number is more than 10, it is difficult to dissolve the sulfonic acid in an aqueous solution. The solubility of the aqueous solution can be adjusted by the addition of a primary or secondary hydroxyl alcohol, such as methanol, ethanol, butanol etc., in an amount in the range of 0.1 to 15 wt %, preferably 1 to 7 wt %.

Examples of the aliphatic sulfonic acid include methane sulfonic acid, ethane sulfonic acid, 1-propanesulfonic acid, 2-propanesulfonic acid, 1-butanesulfonic acid, 2-butanesulfonic acid, 3-methylbutane-1-sulfonic acid, 1-hexanesulfonic acid, 2-methylhexane-3-sulfonic acid, 3-ethylhexane-1-sulfonic acid.

Aliphatic sulfonic acid improves flux surprisingly more than aromatic, cycloaliphatic sulfonic acids, trifluoroacetic acid, nitric acid, hydrochloric acid, sulfuric acid, and mixtures thereof.

In certain embodiments, the single tertiary amine is represented by the formula (VI):

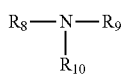

(VI)

where $R_8$, $R_9$ and $R_{10}$ are straight or branched aliphatic hydrocarbon(s) and the hydrocarbon number is from C1 to C7 atoms, preferably C1 to C4.

Examples of the single tertiary amine include trimethylamine, triethylamine, tripropylamine, tributylamine.

It is to be noted that the prior arts, e.g. U.S. Pat. No. 6,063,278, use the polyfunctional amine as a proton acceptor in the membrane. In contrast, in the present invention, the tertiary amine remains in the polymer chain during the interfacial polymerization reaction and maintains the free volume of the polyamide layer, which improves the membrane water flux.

In certain embodiments, the aqueous solution comprises a monomeric polyamine in an amount in the range of 0.1 to 20 wt %, preferably about 0.5 to 8 wt % of the aqueous solution, and an aliphatic sulfonic acid in an amount in the range of 0.25 to 10.0 wt %, preferably about 1.0 to 8.0 wt %, of the aqueous solution.

In certain embodiments, the aqueous solution comprises a monomeric polyamine in an amount in the range of 0.1 to 20 wt %, preferably about 0.5 to 8 wt % of the aqueous solution, an aliphatic sulfonic acid in an amount in the range of 0.25 to 10.0 wt %, preferably about 1.0 to 8.0 wt %, of the aqueous solution, and a single tertiary amine in an amount in the range of 1 to 10 wt %, preferably about 2 to 5 wt % of the aqueous solution.

The pH of the aqueous solution is in the range of about 5.5 to 11, more preferably about 7 to 10, and can be adjusted by the addition of a base such as NaOH or amine compound(s), etc.

The process of coating 120 the microporous support with an aqueous solution to form a liquid layer on the microporous support can be done by any known method, such as dipping, spraying, roller coating or rod coating; after coating, the liquid layer is allowed to remain in place generally for about 5 seconds to 10 minutes, preferably about 20 seconds to 4 minutes; then, the excess aqueous solution is drained off.

In certain embodiments, the aqueous solution further contains a surfactant for more improved results. Examples of such surfactants include sodium dodecyl benzene sulfonate (SDBS), sodium dodecyl sulfate (SDS), sodium lauryl sulfate (SLS) or mixtures thereof. The surfactants are generally employed at a concentration of about 0.01 to 0.5 wt %, preferably about 0.1 to 0.25 wt % of the aqueous solution.

In certain embodiments, the aqueous solution further contains an alcohol for improved results. Examples of such alcohol include methanol, ethanol, isopropyl alcohol, tert-butyl alcohol, or mixtures thereof. The alcohol(s) are generally employed at a concentration of about 0.1 to 15 wt %, preferably about 1 to 7 wt % of the aqueous solution.

The process of contacting 130 the liquid layer with an organic solution to form an organic layer can be done by any known methods, such as dipping or spraying; after the organic layer is formed, it is allowed to remain in place generally for about 1 seconds to 1 minutes, preferably about 5 seconds to 30 seconds; then, the excess organic solution is drained off.

In certain embodiments, the organic solution comprises an amine-reactive reactant and an organic solvent. In certain embodiments, the amine-reactive reactant is one or more compounds selected from the group consisting of a polyfunctional acyl halide, a polyfunctional sulfonyl halide and a polyfunctional isocyanate. Preferably, the amine-reactive reactant is an essentially monomeric, aromatic, polyfunctional acyl halide, examples of which include di- or tricarboxylic acid halides, such as trimesoyl chloride (TMC), isophthaloyl chloride (IPC), terephthaloyl chloride (TPC) and mixtures thereof.

In certain embodiments, the organic solution contains about 0.01 to 5.0 wt/vol %, preferably about 0.05 to 0.5 wt/vol %, of amine-reactive reactant.

The organic solvent employed in the present invention is one which is immiscible with water. In certain embodiments, the organic solvents include alkanes, such as hexane and nonane; cycloalkanes, such as cyclohexane; and halogenated derivatives thereof, such as Freon® (DuPont), including 1,1 2-trichlorotrifluoroethane; and mixtures thereof. In certain embodiments, the organic solvents are alkanes having 8 to 12 carbon atoms and mixtures thereof. Isopar™ E Solvent (Exxon Corp.) is such a mixture of alkanes having 8 to 12 carbon atoms.

In certain embodiments, the organic solution further contains an alcohol for more improved results. Examples of such alcohol include methanol, ethanol, isopropyl alcohol, tert-butyl alcohol, or mixtures thereof. The alcohol(s) are generally employed at a concentration of about 0.001 to 1 wt %, preferably about 0.01 to 0.5 wt % of the organic solution.

The process of drying 140 the microporous support together with the liquid layer and organic layer is done in an oven at a temperature of about 500 to 180° C., preferably about 700 to 150° C. In this manner, a polyamide layer is formed on the microporous support, resulting in a composite polyamide reverse osmosis membrane.

Without wish to be bound by any particular theory, the inventors of the present invention believe that aliphatic sulfonic acid with C1-C5 atoms or an aliphatic sulfonic acid with C1-C5 atoms and a single tertiary amine can remain in the polyamide chain network, thereby maintaining the free volume in the polyamide thin film during the interfacial reaction between the polyfunctional amine (e.g. m-phenylenediamine) and the amine-reactive reactant (e.g. trimesoyl chloride). As a result, the polyamide composite membrane flux is enhanced. Large sulfonic acid compounds such as aliphatic sulfonic acid that consists of more than 10 hydrocarbon chains or an aromatic and cycloaliphatic sulfonic acid are too large in size to exist/stay in the polymer chain network during the interfacial reaction. Consequently, such large sulfonic acid compounds cannot keep the open space (free volume) in the polyamide layer.

The surface roughness can be controlled by the solution formulation, and/or the process conditions used in the interfacial polymerization reaction in the present invention. A method for controlling the surface roughness of the reverse osmosis membrane is by changing the solubility of polyamine reactants and aliphatic sulfonic acid or aliphatic sulfonic acid(s) and single tertiary amine(s) in the organic solvent containing the amine-reactive reactant(s). When the solubility of polyamine reactants and aliphatic sulfonic acid or aliphatic sulfonic acid(s) and single tertiary amine(s) in the organic solvent is high, the surface roughness is increased caused by more diffusion of said reactants into the organic solvent and increased rate of reaction with the amine-reactive reactant(s) in the organic solvent.

The average surface roughness (Ra) of the obtained thin film of the reverse osmosis composite membrane also influences the water permeability of the membrane in the present invention. Ra is in the range of 80 nm to 200 nm, and more preferably, 100 to 150 nm, to control the high flux and the mechanical strength of the thin polyamide film. (The average surface roughness (Ra) of the obtained thin film of the reverse osmosis composite membrane is measured using Atomic Force Microscopy.)

To achieve a water flux greater than 35 gfd in the above reverse osmosis test conditions, the reverse osmosis membrane requires not only the defined Ra but also open spaces (free volume) formed in the present invention. If Ra is the same but shows a different flux, the flux is related to the open spaces (free volume) in the film.

The ratio of water flux, $J_w$, to average surface roughness, Ra, is >0.35 gfd/nm, preferably >0.40 gfd/nm to obtain a membrane with high flux and sufficient mechanical strength.

The following examples are provided for illustrative purposes only and are in no way intended to limit the scope of the present invention.

Example 1

An aqueous solution contains, at a final concentration, 3.0 wt % of m-phenylenediamine (MPD), 3.6 wt % of methane sulfonic acid, 3.9 wt % of Triethylamine (TEA), 0.15 wt % of Sodium Lauryl Sulfite, 3 wt % of Isopropyl alcohol, and reverse osmosis (RO) water as the remainder. The pH of the final solution was adjusted to 7.5-8.0 with NaOH.

The solution was coated on a microporous polysulfone support to form a liquid layer of about 40 μm thickness, and excess solution was removed using a wiper blade. Then, an organic solution containing, at a final concentration, 0.12 wt % trimesoyl chloride (TMC) in Isopar™ E (Exxon Corp.), was applied onto the liquid layer by a dipping process and allowed to sit for 7 seconds. The organic solution when applied by the dipping process usually forms a layer with a thickness of 0.1 mm to 5 mm. The microporous polysulfone layer coated with the above-described solutions was then dried in an oven at 115° C. for 1.5 minutes.

After drying, the membrane was rinsed in 3% citric acid solution and 250 ppm sodium hypochlorite solution and then rinsed in water to remove the above-described chemicals.

The performance of the resulting water permeable membrane was measured by passing an aqueous solution containing 250 ppm of NaCl at pH 7.0, through the membrane at 65 psi (4.5 bar). The salt rejection was 98.5% and the flux was 41 gfd.

Figure 3:
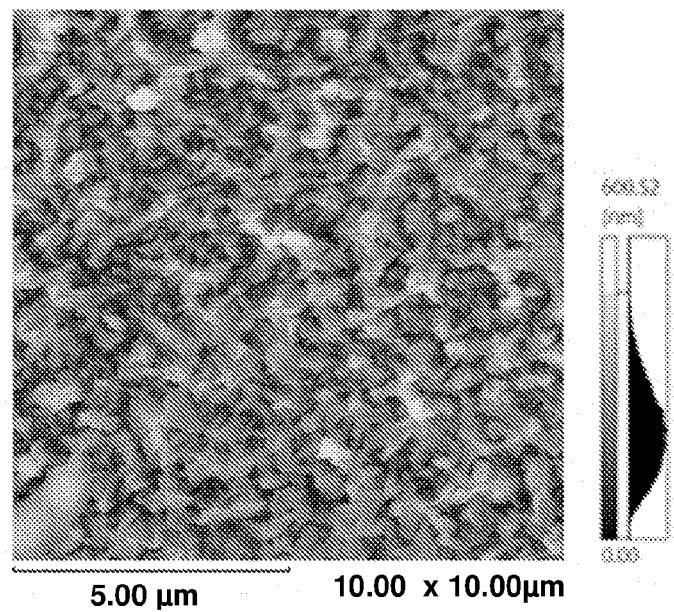
FIG. 3 shows the Atomic Force Microscopy (AFM) images of (a) the resultant composite polyamide reverse osmosis membrane from Example 1, and (b) the membrane from Comparative Example 1.
Figure 3:
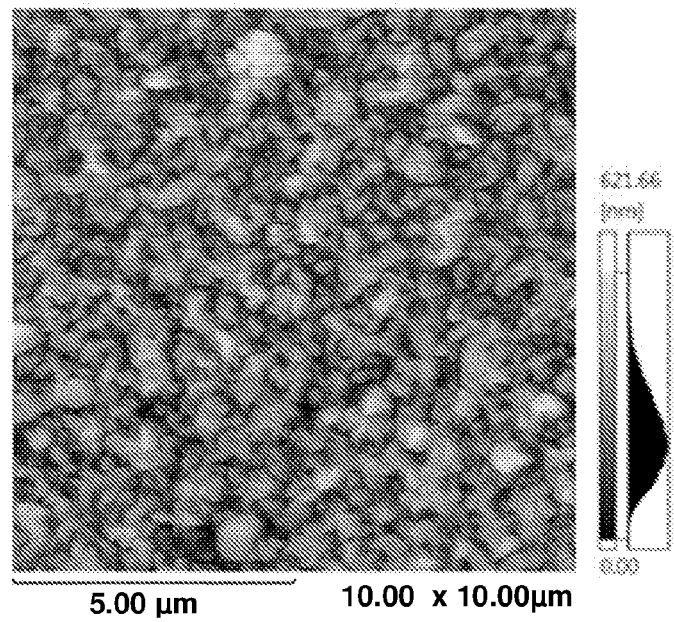

The average surface roughness (Ra) is measured using SPM-9700 (Shimadzu Co.). The Atomic Force Microscopy (AFM) image of the resultant composite polyamide reverse osmosis membrane is shown in FIG. 3a.

Example 2

The procedure of Example 1 was repeated, except using 3.1 wt % of Methane Sulfonic Acid and 3.3 wt % of TEA in the aqueous solution.

The salt rejection was 98.6% and the flux was 38 gfd under the same test conditions as described in Example 1.

Example 3

The procedure of Example 1 was repeated, except that the oven temperature was adjusted to 290° F. (143° C.). The salt rejection was 98.5% and the flux was 38 gfd under the same test conditions as in Example 1.

Comparative Examples A-C: The Procedure of Example 1-3 was repeated, except using a different kind of Sulfonic Acid.

Comparative Example A

The procedure of Example 2 was repeated, except using 6.0 wt % of Camphorsulfonic Acid (CSA). The salt rejection was 98.8% and the flux was 27 gfd under the same test conditions as described in Example 1, which is about 48% lower flux than Example 3. The AFM image of the resultant composite polyamide reverse osmosis membrane is shown in FIG. 3b.

Comparative Example B

The procedure of Example 2 was repeated, except using 3.7 wt % of Trifluoroacetic acid (TFAA). The salt rejection was 98.8% and the flux was 25 gfd under the same test conditions as described in Example 1.

Comparative Example C

The procedure of Example 3 was repeated, except using 4.0 wt % of Camphorsulfonic Acid (CSA), 2.0 wt % of TEA and Isopar™ G as the organic solvent. The salt rejection was 99.3% and the flux was 13 gfd under the same test conditions as described in Example 1.

TABLE 1

Summary of Salt Rejection, Flux ($J_w$), Surface Roughness (Ra), and ratio of $J_w$/Ra for the membranes obtained from the Examples and Comparative Examples described above.

| | SALT REJECTION (%) | FLUX, $J_w$ (gfd) | SUFRACE ROUGHNESS, Ra (nm) | RATIO of $J_w$/Ra (gfd/nm) |
|---|---|---|---|---|
| EXAMPLE 1 | 98.5 | 41 | 91 | 0.45 |
| EXAMPLE 2 | 98.6 | 38 | 89 | 0.43 |
| EXAMPLE 3 | 98.5 | 38 | 89 | 0.43 |
| COMPARATIVE EXAMPLES A | 98.8 | 27 | 82 | 0.33 |
| COMPARATIVE EXAMPLES B | 98.8 | 25 | 82 | 0.30 |
| COMPARATIVE EXAMPLES C | 99.3 | 13 | 80 | 0.16 |

As described above, the composite polyamide reverse osmosis membrane of the present invention is water permeable and has a high salt rejection, and an extremely high water permeability.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

REFERENCES

U.S. Pat. No. 4,277,344 July 1981 Cadotte.
U.S. Pat. No. 4,761,234 August 1988 Uemura et al.
U.S. Pat. No. 4,769,148 September 1988 Fibiger et al.

U.S. Pat. No. 4,830,885 May 1989 Tran et al.
U.S. Pat. No. 4,872,984 October 1989 Tomaschke.
U.S. Pat. No. 4,950,404 August 1990 Chau.
U.S. Pat. No. 4,980,067 December 1990 Hou et al.
U.S. Pat. No. 4,983,291 January 1991 Chau et al.
U.S. Pat. No. 5,576,057 November 1996 Hirose et al.
U.S. Pat. No. 5,614,099 March 1997 Hirose et al.
U.S. Pat. No. 5,746,917 May 1998 Altmeier
U.S. Pat. No. 6,063,278 April 1998 Koo et al.
U.S. Pat. No. 7,001,518 November 2000 Tomaschke.

What is claimed is:

1. A process for fabricating a composite polyamide reverse osmosis membrane, comprising:
   providing a microporous support;
   coating the microporous support with an aqueous solution to form a liquid layer on the microporous support, wherein the aqueous solution comprises:
     a monomeric polyamine having at least two functional amine groups; wherein the monomeric polyamine is in an amount in the range of 0.1 to 20 wt % of the aqueous solution;
     a single tertiary amine, wherein the single tertiary amine is in an amount in the range of 1 to 10 wt % of the aqueous solution; and
     an aliphatic sulfonic acids, wherein the aliphatic sulfonic acid is in an amount in the range of 0.25 to 10.0 wt % of the aqueous solution;
     wherein the aqueous solution has a pH value in the range of 5.5 to 11;
   contacting the liquid layer with an organic solution to form an organic layer on top of the liquid layer; wherein the organic solution comprises:
     an amine-reactive reactant and an organic solvents, wherein the amine-reactive reactant is in the range of 0.01 to 5.0 wt/vol % of the organic solution; and
   drying the microporous support together with the liquid layer and organic layer at a temperature of about 50° to 180° C.;
   thereby a composite polyamide reverse osmosis membrane is fabricated.

2. The process of claim 1, wherein the monomeric polyamine is an aromatic primary diamine represented by formula (I):

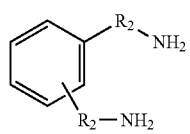

(I)

wherein $R_1$ and $R_2$ are selected from the group consisting of an alkyl group, an alkoxy group, a hydroxy alkyl group, a hydroxy group, and a halogen atom, wherein $R_1$ and $R_2$ is in the meta-, ortho-, or para-position on the aromatic ring.

3. The process of claim 2, wherein the monomeric polyamine is selected from the groups consisting of m-phenylenediamine, p-phenylenediamine, and substituted derivatives thereof.

4. The process of the claim 1, wherein the monomeric polyamine is an aliphatic primary diamine represented by formula (II):

$$H_2N—R_3—NH_2 \quad (II)$$

wherein $R_3$ is selected from the group consisting of a straight or a branched aliphatic hydrocarbon chain, a cycloaliphatic hydrocarbon consisting of 4 or more carbon atoms, and a branched aliphatic hydrocarbon chain containing an aromatic or cycloaliphatic ring.

5. The process of claim 1, wherein the monomeric polyamine is an aromatic secondary diamine represented by formula (III):

(III)

wherein $R_4$ and $R_5$ are straight or branched aliphatic hydrocarbon groups, which contain aromatic rings, and wherein the $R_4$ and $R_5$ are in the meta-, ortho- or para-positions on the aromatic ring.

6. The process of claim 5, wherein the aromatic secondary diamine is selected from the group consisting of N,N'-dimethyl-1,3-phenylenediamine, and N-(1,3-Dimethylbutyl)-N'-phenyl-p-phenylenediamine.

7. The process of claim 1, wherein the monomeric polyamine is a cycloaliphatic, secondary diamine represented by formula (IV):

(IV)

wherein $R_6$ is a cycloaliphatic hydrocarbon.

8. The process of claim 7, wherein the cycloaliphatic, secondary diamine is piperazine.

9. The process of claim 1, wherein the aliphatic sulfonic acid is represented by the formula (V)

(V)

wherein $R_7$ is a straight or a branched aliphatic hydrocarbon(s) and the hydrocarbon number is from C1 to C10 atoms.

10. The process of claim 9, wherein the aliphatic sulfonic acid is selected from the group consisting of methane sulfonic acid, ethane sulfonic acid, 1-propanesulfonic acid, 2-propanesulfonic acid, 1-butanesulfonic acid, 2-butanesulfonic acid, 3-methylbutane-1-sulfonic acid, 1-hexanesulfonic acid, 2-methylhexane-3-sulfonic acid, and 3-ethylhexane-1-sulfonic acid.

11. The process of claim 1, wherein the single tertiary amine is represented by the formula (VI):

(VI)

wherein $R_8$, $R_9$ or $R_{10}$ is a straight or a branched aliphatic hydrocarbon and the hydrocarbon number is from C1 to C7 atoms.

12. The process of claim 11, wherein the single tertiary amine is selected from the group consisting of trimethylamine, triethylamine, tripropylamine, and tributylamine.

13. The process of claim 1, wherein the aqueous solution further comprises a surfactant selected from the group consisting of sodium dodecyl benzene sulfonate (SDBS), sodium dodecyl sulfate (SDS), sodium lauryl sulfate (SLS), and mixtures thereof; wherein the surfactant is the range of 0.01 to 0.5 wt % of the aqueous solution.

14. The process of claim 1, wherein the aqueous solution further comprises an alcohol selected from the group consisting of methanol, ethanol, isopropyl alcohol, tert-butyl alcohol, and mixtures thereof; wherein the alcohol is in the range of 0.1 to 15 wt % of the aqueous solution.

15. The process of claim 1, wherein the amine-reactive reactant is selected from the group consisting of a polyfunctional acyl halide, a polyfunctional sulfonyl halide and a polyfunctional isocyanate.

16. The process of claim 15, wherein the amine-reactive reactant is selected from the group consisting of trimesoyl chloride (TMC), isophthaloyl chloride (IPC), terephthaloyl chloride (TPC), and mixtures thereof.

17. The process of claim 1, wherein the organic solution further comprises an alcohol selected from the group consisting of methanol, ethanol, isopropyl alcohol, tert-butyl alcohol, and mixtures thereof; wherein the alcohol is in the range of 0.001 to 1 wt % of the organic solution.

* * * * *